UNITED STATES PATENT OFFICE.

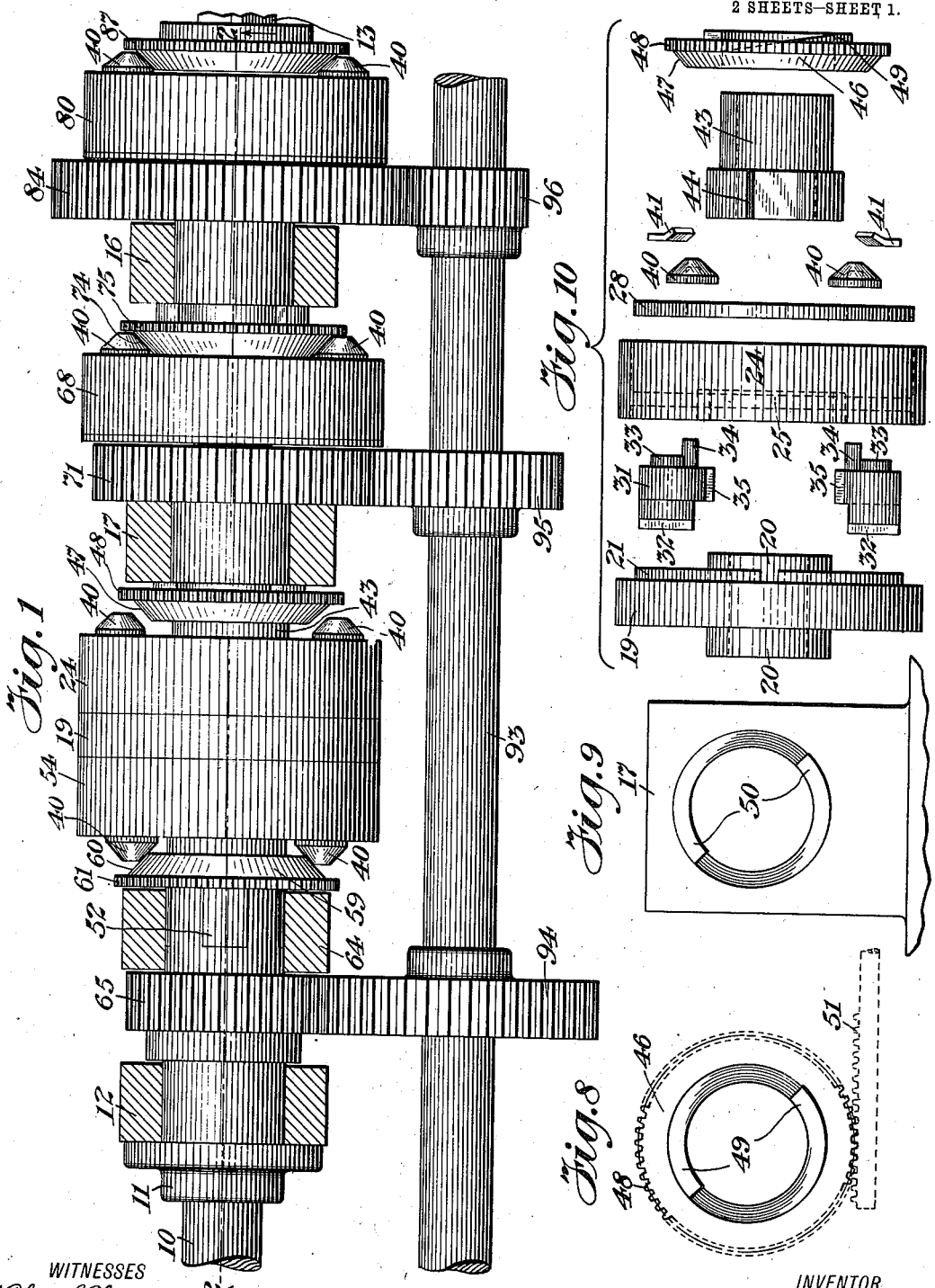

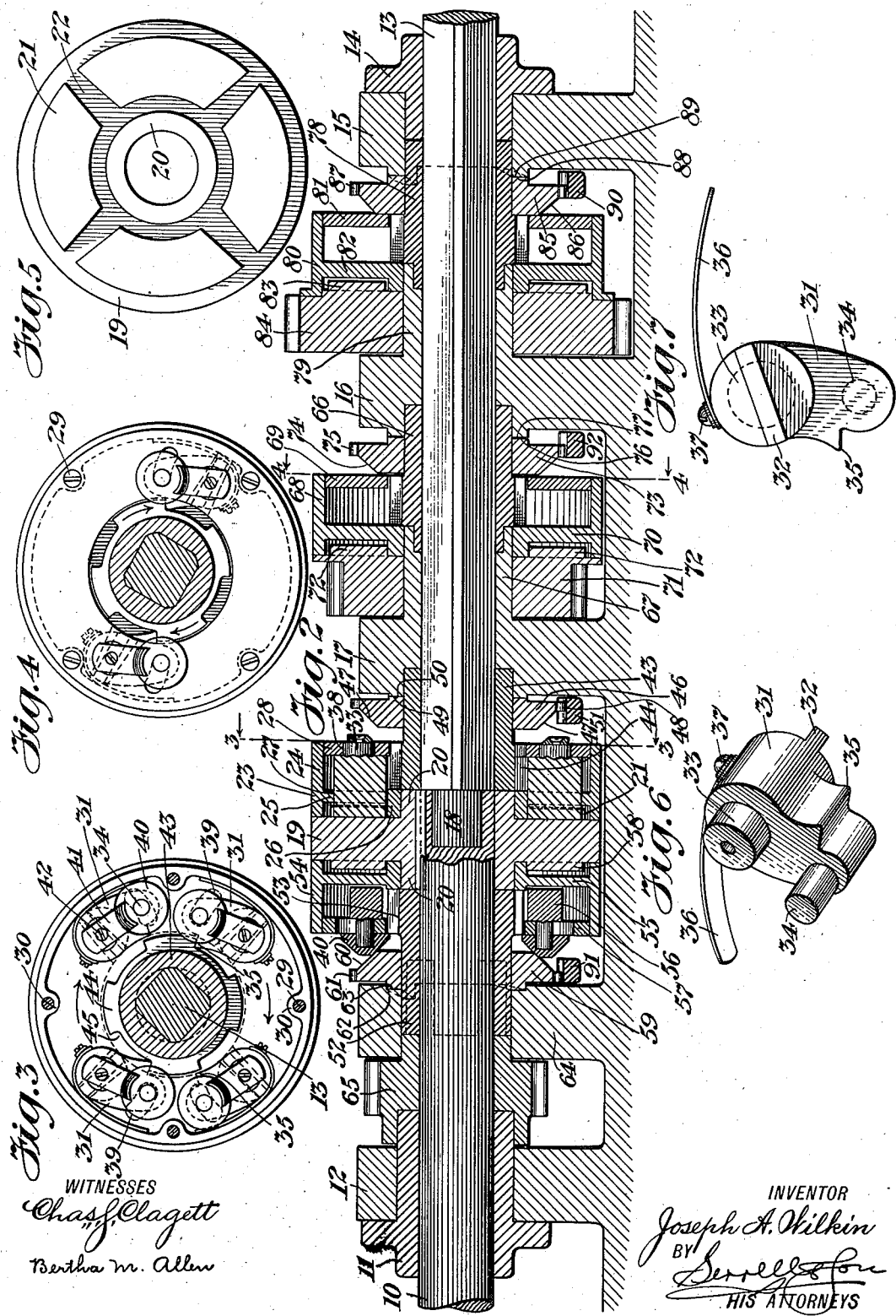

JOSEPH A. WILKIN, OF MATAMORAS, PENNSYLVANIA.

VARIABLE-SPEED-TRANSMISSION APPARATUS.

1,136,636. Specification of Letters Patent. Patented Apr. 20, 1915.

Application filed May 12, 1914. Serial No. 838,012.

*To all whom it may concern:*

Be it known that I, JOSEPH A. WILKIN, a citizen of the United States, residing at Matamoras, in the county of Pike and State of Pennsylvania, have invented an Improvement in Variable-Speed-Transmission Apparatus, of which the following is a specification.

My present invention relates to apparatus for transmitting power at variable speeds, and is adapted for use in motor cars, motor boats, factories, and other similar places, where it is desirable or necessary to provide for a change of speed at which any given mechanism is driven without changing the speed of the prime mover.

The object of my present invention is the provision of a transmission apparatus in which the spur gears, which are preferably employed, are always in mesh, thereby avoiding the danger and liability of stripping the teeth of these gears in effecting a change in the speed of the driven mechanism, when the gears are brought together after having been separated; an apparatus in which the drive and driven shafts employed are preferably in alinement and may be directly connected to turn in both directions and disconnected so that the drive shaft may be moved independently of the driven shaft; an apparatus in which a suitable shaft is employed and preferably placed in a position parallel with the said drive and driven shafts, one set of the spur gears, as will be understood, being fixed to a counter-shaft, so that the same may be turned from the drive shaft and its motion transmitted to the driven shaft; an apparatus in which suitable clutch or connecting devices are associated with the spur gears, turned by the drive shaft, or employed for turning the driven shaft, the spur gears and the clutch devices with which the same are associated, being mounted independently of the said drive and driven shafts, so that these shafts are relieved of the duty of carrying the weight of these actuating parts, thereby effecting an economy in the power employed to drive the apparatus; an apparatus in which none of the actuating parts associated with the drive and driven shafts are turned or brought into play, at any time, except when actually in use, which, as will be understood, results in a further saving of the power necessary to drive the apparatus; and also an apparatus in which the parts may be operated in an oil bath within the casing so as to work noiselessly and with as little friction as possible, all of which will be hereinafter more particularly described.

In the drawing, Figure 1 is a plan and partial section illustrating the variable speed transmission apparatus made in accordance with my present invention. Fig. 2 is a sectional elevation on line 2, 2, Fig. 1. Fig. 3 is a cross section on line 3, 3, Fig. 2. Fig. 4 is a cross section on line 4, 4, Fig. 2. Fig. 5 is a front elevation of the drive disk face at one end of the drive shaft. Fig. 6 is a perspective view illustrating one of the dog members employed in the clutch. Fig. 7 is a side elevation of one of these dog members. Fig. 8 is a side elevation of one of the rings employed to operate the clutch members, showing in dotted lines a rack by which the ring may be revolved. Fig. 9 is a side elevation illustrating one face of the journal block, with cams thereon, adapted to coöperate with similar cams on the ring members employed for operating the clutches, and Fig. 10 is a view illustrating, in side elevation, the members of the clutch employed in my present invention, in the order in which the same are placed in assembling the parts to form the clutch.

Referring to the drawing, my improved variable speed transmission apparatus preferably comprises a drive shaft 10, journaled at one end in a sleeve 11, which is mounted in a bearing block 12, the drive shaft 10 being circular in cross section. I also employ a driven shaft 13, which, at one end, of the transmission apparatus, is adapted to turn in a sleeve 14, mounted in the bearing block 15. This driven shaft 13 is preferably rectangular in cross section, and passes through and is adapted to turn in a series of bearing blocks 16 and 17. The diameter of the bearings in these blocks is substantially equal to the diagonal dimension of the driven shaft 13, the number of these bearing blocks, illustrated in the drawing, being three, because there is illustrated a double change in speed when the driven shaft is turned through the intermediate shaft, but, as will be understood, any number of these bearing blocks may be employed, depending upon the number of speed changes desired to be effected by the apparatus.

One end of the drive shaft 10 is recessed to receive the corresponding reduced and cylindrical end 18 of the driven shaft, in order to maintain these shafts in alinement with one another and still permit them to turn independently, the one of the other. On the recessed end of the drive shaft 10, a drive disk 19 is fixed by being keyed thereto, as shown, or shrunk thereon or secured in any other desirable manner. The drive disk 19 is provided with hub flanges 20 extending from both sides thereof over the drive shaft 10, and on its opposite faces the drive disk 19 is provided with a series of segmental plates 21, providing for recesses 22 between the adjacent ends of these segmental plates. The recesses 22, as clearly shown in Fig. 5, are radially disposed and are wider at their inner than at their outer ends. On the right hand side of the drive disk 19, as shown in Figs. 1 and 2, I employ a clutch case 23. This member preferably comprises a rim 24, of the same diameter as the drive disk, and a web 25, connecting the rim 24 with a hub or flange 26, adapted to fit over and turn upon the adjacent drive disk hub 20, and the web 25 of the clutch case is provided with suitably spaced openings 27, the purpose of which will be hereinafter indicated. At the side opposite the drive disk 19, this clutch case is fitted with a face plate 28, which may be secured in position therein by means of screws 29, which pass therethrough and are turned down into tapped lugs 30 provided for this purpose on the inner side of the rim of the clutch case, as is indicated in Figs. 3 and 4. Within this clutch case, I employ a plurality of dogs 31. Each of these dogs, on one face, has a rib 32, and on its opposite face a trunnion 33, extending from which latter face there is also a pin 34. Each dog 31 also includes a tooth 35, and associated with each dog is a spring 36 which is preferably connected thereto by a screw and washer 37, or otherwise.

The face plate 28 is provided with suitably spaced openings, corresponding in position with the openings 27 in the web of the clutch case, and each of these openings 38 is adapted to receive the trunnion 33 of one of the dogs, the trunnion passing through the opening and being journaled therein. The face plate 28 is also provided with series of elongated openings 39, through each of which the pin 34 of one of the dogs 31 passes. The rib 32 of each of these dogs extends through one of the openings 27, in the web of the clutch case, and into one of the recesses 22, between the ends of the segmental plates 21 on the adjacent face of the drive disk 19, and the operation of these parts will be hereinafter more particularly described.

Exteriorly of the face plate 28, each pin 34 is fitted with a button 40, the outer surface of which is tapered or pointed, each button 40 being secured in position relative to its pin by means of a stop arm 41, which is fixed by a screw 42, passed through the end of its stop arm and into a tapped opening provided therefor in the trunnion 33 of the corresponding dog. On the end of the rectangular driven shaft 13, adjacent the end of the drive shaft, is a collar 43. This collar 43 extends within the clutch case and therein is provided with a series of spaced teeth 44, and intermediate recesses 45. As will be seen, by reference to Figs. 3 and 4, wherein these features are clearly illustrated, the teeth 44 are substantially the same extent as the recesses 45, for the purpose which will readily appear from the description of the operation of the dogs in connection with these teeth and the intervening recesses.

It will be understood that the collar 43 is maintained in position on the driven shaft 13 and caused to revolve therewith by being provided with a rectangular recess through which the driven shaft passes. On the collar 43 is a ring 46, adapted to turn freely thereon. On one side, this ring 46 is provided with an inclined face 47 adapted to contact with the inclined faces of the buttons 40. At its periphery, the ring 46 is provided with a series of teeth 48, and on the side opposite that in which the inclined face 47 is provided this ring 46 has cams 49. On the adjacent face of the bearing block 17, the cams 50 are also provided, these being oppositely disposed to the cams 49, on the ring 46, and adapted to coöperate therewith to shift the ring longitudinally on the collar 43. Also as shown in Figs. 2 and 8, a rack bar 51 may be employed and actuated by levers or any other suitable means to partially revolve the ring 46, in order, through the cams 49 and 50, to shift the same longitudinally on the collar 43.

Suitably placed on the drive shaft 10 is a divided collar, the parts of which are indicated at 52. The adjacent ends of this collar are provided with projections and intervening recesses, the projections on the one extending into and fitting within the recesses on the other, so that when in position, these parts form a connected member. At one end, the divided collar 52 is provided with a series of spaced teeth 53, similar in all respects to the teeth 44 in the collar 43, and these teeth 53 extend within a clutch case 54, which is similar in all respects to the clutch case 23, except that it is on the opposite side of the drive disk 19 and consequently in a reversed position.

The clutch case 54 is provided with a web 55, and is fitted with dogs 56, similar to the dogs 31, and a face plate 57, similar to the face plate 28, while the opposite face of the drive disk 19 is provided with a series of spaced segmental plates 58, similar in all respects to the segmental plates 21. The opposite end of the divided collar 52 extends into the bearing block 64, and between the same and the face plate 57, carries a ring 59, which is mounted to turn freely thereon. This ring, on one side, has an inclined face 60, adapted to contact with the buttons 40 on the dogs 56, and at its periphery the ring 59 is provided with gear teeth 61, adapted to mesh with the tooth of a rack 91, in order to revolve or partially revolve the same so that through the action of the cams 62 and 63, which are similar, respectively, to the cams 49 and 50, this ring 59 might be shifted longitudinally on the collar 52. On the opposite side of the bearing block 64, and between the same and the bearing block 12, the drive shaft 10 is fitted with a gear 65, which is loosely mounted thereon. Between the bearing blocks 16 and 17, the driven shaft 13 is fitted with a collar 66 provided with an aperture adapted to receive the driven shaft so as to be turned thereby, the opposite ends of the collar 66 being journaled in the bearing block 16 and an extension 67 of the bearing block 17.

On the extension 67 of the bearing block 17, there is a clutch case 68, similar to those hereinbefore described, being provided with a face plate 69 and a web 70, terminating in a suitable hub adapted to turn on the extension 67 of the bearing block 17. On this extension 67 is also loosely mounted a gear 71, provided on one face with segmental plates 72 with intervening recesses, each adapted to receive a rib 32 of one of the series of dogs employed in this clutch case, the dogs being similar in all respects to those hereinbefore described.

Mounted to turn loosely on the collar 66 is a ring 73. This ring is also provided on one side with an inclined face 74, adapted to contact with the buttons 40 of the dogs employed in the clutch case 68, and also has a periphery with the teeth 75 adapted to mesh with the teeth of a rack 92, in order to turn or partially revolve the ring 73, in order, through the action of the cams 76 and 77, to shift the ring 73 longitudinally on the collar 66. Similarly, between the bearing blocks 15 and 16, a collar 78 is placed upon the driven shaft 13, this collar being provided with a recess through which the shaft passes in order to turn therewith. At one end, this collar 78 is journaled in the bearing block 15, and at the other end in an extension 79 of the bearing block 16. On the extension 79 of the bearing block 16, is a clutch case 80, fitted with a face plate 81 and a web 82, and adapted to contain a series of dogs 31, in the same manner as the clutch cases hereinbefore described. Also mounted on the extension 79, of the bearing block 16, is a gear 84, provided on one face with spaced segmental plates 83 to coöperate with the dogs of the clutch case, in the same manner as similar structures hereinbefore described. On the collar 78 is a ring 85, on one side of which there is an inclined face 86, adapted to engage the inclined faces of the buttons 40, associated with the dogs employed in the clutch case 80, and on its periphery the ring 85 is provided with a gear wheel 87 adapted to mesh with the teeth on a rack 90, to revolve or partially revolve the ring 85, so that through the coöperation of the cams 88 and 89, the ring 85 may be shifted longitudinally on a collar 78. I also employ a counter-shaft, indicated at 93. This is journaled in suitable bearings and is provided with a series of spur gear wheels, indicated, respectively, at 94, 95 and 96, the gear wheel 94 meshing with the gear wheel 65, the gear wheel 95 meshing with the gear wheel 71, and the gear wheel 96 meshing with the gear wheel 84.

In the operation of the hereinbefore described apparatus, the series of dogs in the clutch case 23 are employed to directly connect or disconnect the drive shaft 10 and the driven shaft 13. These dogs are employed in oppositely disposed pairs, as clearly shown in Fig. 3, one pair being employed to turn the driven shaft in one direction, and the other pair to turn the driven shaft in the opposite direction, depending of course upon the direction upon which the drive shaft 10 is revolved. These dogs are so placed that when either pair is in engagement with the oppositely disposed teeth 44, the teeth 35 of the dogs are adapted to engage the teeth 44 of the collar 43. The corresponding teeth 35 of the other pair of dogs may rest upon the surfaces of the teeth 44, which are in engagement but adjacent the opposite ends thereof. It will also be apparent that in turning the drive disk 19 from the drive shaft 10, and depending upon the direction in which these parts are turned, one set of dogs 31, in the clutch case 23, will be turned into engagement with the teeth 44, while the opposite pair of dogs will be turned out of engagement with these teeth, this being accomplished through the dogs being swung on their trunnions 33 by the action of the ends of the segmental plates 21 acting against the surfaces of the ribs 32 on the dogs. It will further be appreciated that in order for the dogs to be sufficiently far for their teeth to come into engagement with the teeth 44 of the collar 43, I preferably employ only a number of the teeth 44 corresponding to the number of the dogs employed, in order that the recesses intervening between these teeth may be sufficiently long to permit of this movement of the dogs before the teeth thereof come into contact with the teeth of the collar. Still furthermore, it will be apparent that the springs 36 employed with each of the dogs is only a means of assisting the action thereof.

As indicated in Figs. 1 and 2, the parts are in position for the drive shaft to drive the driven shaft directly. It will be understood, however, that the rack 51 may be moved to turn the ring 46 to shift the same from right to left, as shown in these figures, through the action of the cams 49 and 50, in order to cause the inclined surfaces of the ring 46 to bear against the inclined surfaces of the buttons 40 and the dogs 31 to swing all of the dogs out of operative contact with the teeth 44 and the collar 43, in which position, as will be understood, the drive shaft 10 will be turned independently of the driven shaft 13. The ring 59 may then be shifted, through actuating the ring 91, to release the dogs associated with the clutch case 54, permitting them to engage the teeth on the divided collar 52, so as to turn the gear 65 by and with the drive shaft 10. This, as will be understood, drives the counter-shaft 93 through the gear wheel 94 and the counter-shaft 93 either through the gears 95 and 71, or the gears 96 and 84 may be connected to the driven shaft 13 to turn the same by suitably operating either the ring 73 or the ring 85 to throw in or out the dogs employed in their respective clutch cases, in order to effect the different speeds of the driven shaft from the common or uniform speed of the drive shaft.

It is to be noted that the particular invention, involved in this application, relates to the manner in which the actuating parts are mounted on the pair of bearing blocks independently of the driven shaft, in order, as hereinbefore stated, to relieve this shaft of carrying these parts, when not in use, and hence reducing to a minimum the power necessary to drive or turn the driven shaft alone.

The specific form of clutch mechanism, hereinbefore shown and described, forms the subject-matter of my copending application, Serial No. 733,724, filed October 1, 1912, and hence the invention, in the present case, relates in no wise to the clutch mechanisms.

I claim as my invention:

1. A variable speed transmission apparatus comprising a drive shaft, a driven shaft, bearings therefor, means for connecting and disconnecting the drive and driven shafts, a gear and a clutch device associated therewith mounted to turn freely on a bearing of the driven shaft, a collar fixed on the said driven shaft and adapted to be engaged by the said clutch device, an intermediate shaft, a connection between the same and the said gear and clutch device, and means for operating the said clutch device to cause the same to engage the said collar in order to turn the driven shaft from the said intermediate shaft and the said connection and gear and clutch device.

2. A variable speed transmission apparatus comprising a drive shaft and driven shaft, means for connecting and disconnecting the drive and driven shafts, bearings for the said drive and driven shafts, an intermediate shaft, means for connecting and disconnecting the drive and intermediate shafts, a gear and associated clutch device, so mounted on a bearing of the driven shaft as to turn independently thereof, a collar as to turn independently thereof, a collar fixed on the driven shaft and adapted to be engaged by the said clutch device, a gear on the said intermediate shaft meshing with the gear associated with the said clutch device, and means for actuating the said clutch device to cause the same to engage the said collar.

3. A variable speed transmission apparatus, comprising a drive shaft, a driven shaft of rectangular cross section, bearings for the said shafts, means for connecting and disconnecting the said drive and driven shafts, an intermediate shaft, means for connecting and disconnecting the said drive and intermediate shafts, a gear and associated clutch device so mounted on a bearing of the driven shaft as to turn independently thereof, a collar fixed on the said driven shaft and adapted to be engaged by the said clutch device, a gear fixed on the intermediate shaft and meshing with the aforesaid gear, a ring loosely mounted on the said collar, and means for actuating the said ring to cause the same to connect and disconnect the said clutch device with and from the said collar.

4. A variable speed transmission apparatus comprising a drive shaft, circular in cross section, a driven shaft rectangular in cross section, bearings for the said shafts, an intermediate shaft, means for connecting and disconnecting the drive and driven shafts, a divided sleeve on the drive shaft, a clutch member associated with one part of the said divided sleeve, a gear connected to the other part of the divided sleeve, means for connecting and disconnecting the said clutch member to the divided sleeve to turn the same and the said gear thereon, a gear on the intermediate shaft constantly in contact with the aforesaid gear, a plurality of gear and clutch devices mounted on the bearings of the said driven shaft, so that the same may turn independently thereof, a plurality of gears on the intermediate shaft, each of which is constantly in engagement with one of the said plurality of gears of the gear and clutch devices on the bearings of the driven shaft, and means for connecting and disconnecting any one of the said plurality of gear and clutch devices to and from the said driven shaft so that the same may be turned from the intermediate shaft and the gears thereon.

5. A variable speed transmission apparatus comprising a drive shaft, circular in cross section, a driven shaft, rectangular in cross section, bearings for the said shafts, an intermediate shaft, means for connecting and disconnecting the drive and driven shafts, a divided sleeve on the drive shaft, a clutch member associated with one part of the said divided sleeve, a gear connected to the other part of the divided sleeve, means for connecting and disconnecting the said clutch member to the divided sleeve to turn the same and the said gear thereon, a gear on the intermediate shaft constantly in contact with the aforesaid gear, a plurality of sleeves mounted on and secured to the said driven shaft, a corresponding number of gear and clutch devices each mounted on a bearing, and one of the said sleeves on the driven shaft, so that the same may be turned independently thereof, a corresponding number of gears secured to the said intermediate shaft, each meshing with one of the said gears of the said gear and clutch devices, and means for connecting and disconnecting the said gear and clutch devices to the said sleeves, so that the said driven shaft may be turned through the same and the corresponding gears on the intermediate shaft.

Signed by me this 30th day of April, 1914.

JOSEPH A. WILKIN.

Witnesses:
F. E. WILKIN,
EMERSON E. STIDD.